United States Patent
Kurose

(10) Patent No.: US 7,149,486 B2
(45) Date of Patent: Dec. 12, 2006

(54) MOBILE COMMUNICATION SYSTEM INCLUDING SCHEDULER AND MOBILE COMMUNICATION TERMINAL OF THE SYSTEM

(75) Inventor: Kengo Kurose, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 49 days.

(21) Appl. No.: 11/090,888

(22) Filed: Mar. 24, 2005

(65) Prior Publication Data

US 2006/0084427 A1  Apr. 20, 2006

(30) Foreign Application Priority Data

Sep. 27, 2004  (JP) ............................. 2004-280149

(51) Int. Cl.
*H04Q 7/20* (2006.01)
(52) U.S. Cl. ............ 455/226.2; 455/135; 455/161.3; 455/226.1; 370/332
(58) Field of Classification Search ............. 455/403, 455/405, 115.1, 115.3, 132, 133, 134, 135, 455/161.3, 517, 226.2, 423, 424, 425; 370/332, 370/333
See application file for complete search history.

(56) References Cited

U.S. PATENT DOCUMENTS

| | | | |
|---|---|---|---|
| 5,454,026 A * | 9/1995 | Tanaka ........................ 455/437 |
| 6,760,588 B1 * | 7/2004 | Okajima et al. ............. 455/437 |
| 6,813,508 B1 * | 11/2004 | Shioda et al. ............... 455/525 |
| 6,889,041 B1 * | 5/2005 | Miyoshi et al. ............. 455/423 |
| 2005/0053038 A1 * | 3/2005 | Kimura ....................... 370/333 |
| 2005/0085230 A1 * | 4/2005 | Welncik et al. ............. 455/437 |

FOREIGN PATENT DOCUMENTS

| JP | 4-70094 A | 3/1992 |
|---|---|---|
| JP | 2003-61150 A | 2/2003 |

* cited by examiner

*Primary Examiner*—CongVan Tran
(74) *Attorney, Agent, or Firm*—Frishauf, Holtz, Goodman & Chick, PC

(57) ABSTRACT

Each mobile communication terminal receives an evaluation function threshold value of each base station transmitted from the base station, and calculates the evaluation function value of each base station on the basis of communication quality between the mobile communication terminal and base station. The mobile communication terminal compares the calculated evaluation function value of each base station with the received evaluation function threshold value, selects a base station which is highly likely to select the mobile communication terminal on the basis of the comparison result, and transmits a communication request to the selected base station.

12 Claims, 4 Drawing Sheets

DRC storage table

| Base station | DRC |
|---|---|
| BS1 | DRC (BS1) |
| BS2 | DRC (BS2) |

Evaluation function value storage table

| Base station | Evaluation function value (mobile station) | Evaluation function value (base station) |
|---|---|---|
| BS1 | AM_Eval (BS1) | AB_Eval (BS1) |
| BS2 | AM_Eval (BS2) | AB_Eval (BS2) |

MOBILE COMMUNICATION SYSTEM INCLUDING SCHEDULER AND MOBILE COMMUNICATION TERMINAL OF THE SYSTEM

CROSS-REFERENCE TO RELATED APPLICATIONS

This application is based upon and claims the benefit of priority from prior Japanese Patent Application No. 2004-280149, filed Sep. 27, 2004, the entire contents of which are incorporated herein by reference.

BACKGROUND OF THE INVENTION

1. Field of the Invention

The present invention relates to a mobile communication system including a scheduler which causes a base station to select a mobile communication terminal as a communication destination in response to communication requests from mobile communication terminals, and a mobile communication terminal of the system.

2. Description of the Related Art

As one mobile communication system, the 1xEV-DO system based upon a technical standard document "C.S0024 cdma2000 High Rate Packet Data Air Interface Specifications" by a standardizing organization "3GPP2" is known. In the EV-DO system, a mobile communication terminal measures the reception quality of a downstream channel by a pilot signal transmitted from a base station. On the basis of this measurement result, the mobile communication terminal determines a data modulation method, and notifies the base station of the determined modulation method. The base station transmits data to the mobile communication terminal as a request source by using the notified data modulation method. In this system, as long as the reception quality of a mobile station is high, data can be transmitted by using a high data transmission rate although the error resistance is low. On the other hand, if the reception quality is low, data can be transmitted by a modulation method having a low speed but a high error resistance.

The cdma2000 1xEV-DO system uses TDMA (Time Division Multiple Access) as a downstream data transmission communication method in the direction from a base station to a mobile communication terminal. In this access method, time is divided into units of 1/600 sec (to be referred to as slots hereinafter), and mobile communication terminals requesting communication are allocated in one-to-one correspondence with these slots. In this manner, each mobile communication terminal is temporarily allowed to exclusively possess one slot. By the use of this method, the base station can transmit data with the maximum transmission power to each mobile communication terminal. In this way, data communication can be performed at the highest communication rate between the base station and each mobile communication terminal.

Conventionally, a scheduling algorithm (to be referred to as a scheduler hereinafter) to be described below, for example, is used to allocate mobile communication terminals to the slots. That is, each mobile communication terminal measures the downstream reception quality of each of a plurality of base stations, and predicts data communication rates usable under the measured reception qualities. The mobile communication terminal then selects a base station having the highest predicted data communication rate, and requests the selected base station to communicate. If communication requests are transmitted from a plurality of mobile communication terminals, a base station selects, from among these mobile communication terminals, a mobile communication terminal which has reported the highest predicted data communication rate. The base station allocates a slot to the selected mobile communication terminal, and transmits packet data. This maximizes the throughput viewed from the base station. However, this also extremely lowers the probability that a mobile communication terminal whose reception quality is not so high is selected. This significantly increases the unfairness of the throughput with respect to receiving environments between mobile communication terminals.

To prevent this, the 1xEV-DO system, for example, uses a PF (Proportional Fairness) scheduler as a scheduler which increases both the throughput viewed from a base station and throughput viewed from a mobile communication terminal. In addition to the downstream reception quality of the mobile communication terminal, the PF scheduler takes account of a data amount which a base station transmitted to each mobile communication terminal in the past, as an index by which the base station selects a mobile communication terminal.

For example, the base station calculates an evaluation function value "DRC/R" for each mobile communication terminal. "DRC" is a predicted data communication rate of a downstream channel, which is notified from a mobile communication terminal to the base station. "R" is a data amount (more specifically, the mean value of the rates of data communications performed in the past) which the base station transmitted to a mobile communication terminal in the past. The base station then selects a mobile communication terminal having the largest calculated evaluation function value "DRC/R". The use of this PF scheduler raises the probability that a mobile communication terminal having a small past data transmission amount is selected. This makes it possible to alleviate the unfairness of the throughput with respect to receiving environments between mobile communication terminals.

Details of the PF scheduler are described in e.g., IEEE International Conference, VTC 2000 Spring Transactions, A. Japali, R. Padovani, R. Pankaj, "Data throughput of CDMA-HDR a High Efficiently-High Data Rate Personal Communication Wireless System".

Unfortunately, the existing system using the PF scheduler described above has another problem as follows. That is, a mobile communication terminal unconditionally selects a base station having the highest reception quality, and transmits a communication request. However, the probability of each mobile communication terminal being selected by a base station depends not only on the reception quality or the past data transmission amount, but also on the traffic of the base station. For example, the probability of a mobile communication terminal being selected by a base station having the highest reception quality but high traffic is low. By contrast, if a mobile communication terminal transmits a communication request to a base station having somewhat low reception quality but low traffic, the probability of this mobile communication terminal being selected rises.

BRIEF SUMMARY OF THE INVENTION

It is an object of the present invention to provide a mobile communication system capable of scheduling by taking account not only of the reception quality and past data transmission amount, but also of the traffic amount of a base station, thereby further increasing the throughput of the entire system, and a mobile communication terminal of the system.

To achieve the above object, an aspect of the present invention is a mobile communication system comprising a plurality of base stations, and a plurality of mobile communication terminals each of which transmits a communication request to one of the plurality of base stations and communicates with the base station, each base station comprising evaluation function calculating means, mobile communication terminal selecting means, evaluation function threshold value calculating means, and evaluation function threshold value transmitting means. An evaluation function value of each of a plurality of mobile communication terminals which have transmitted the communication requests is calculated, and a mobile communication terminal as a communication destination is selected on the basis of the calculated evaluation function value of each mobile communication terminal. Also, an evaluation function threshold value representing a selection standard is calculated on the basis of an evaluation function value of a mobile communication terminal selected in a past predetermined period, and the calculated evaluation function threshold value is transmitted to the plurality of mobile communication terminals. On the other hand, each mobile communication terminal comprises evaluation function threshold value receiving means, evaluation function value calculating means, base station selecting means, and communication request transmitting means. An evaluation function threshold value of each base station transmitted from the base station is received, and an evaluation function value of each of the plurality of base stations is calculated on the basis of communication quality between the mobile communication terminal and base station. The calculated evaluation function value of each base station is compared with the received evaluation function value, and, on the basis of the comparison result, a base station which is highly likely to select the mobile communication terminal is selected. A communication request is transmitted to the selected base station.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
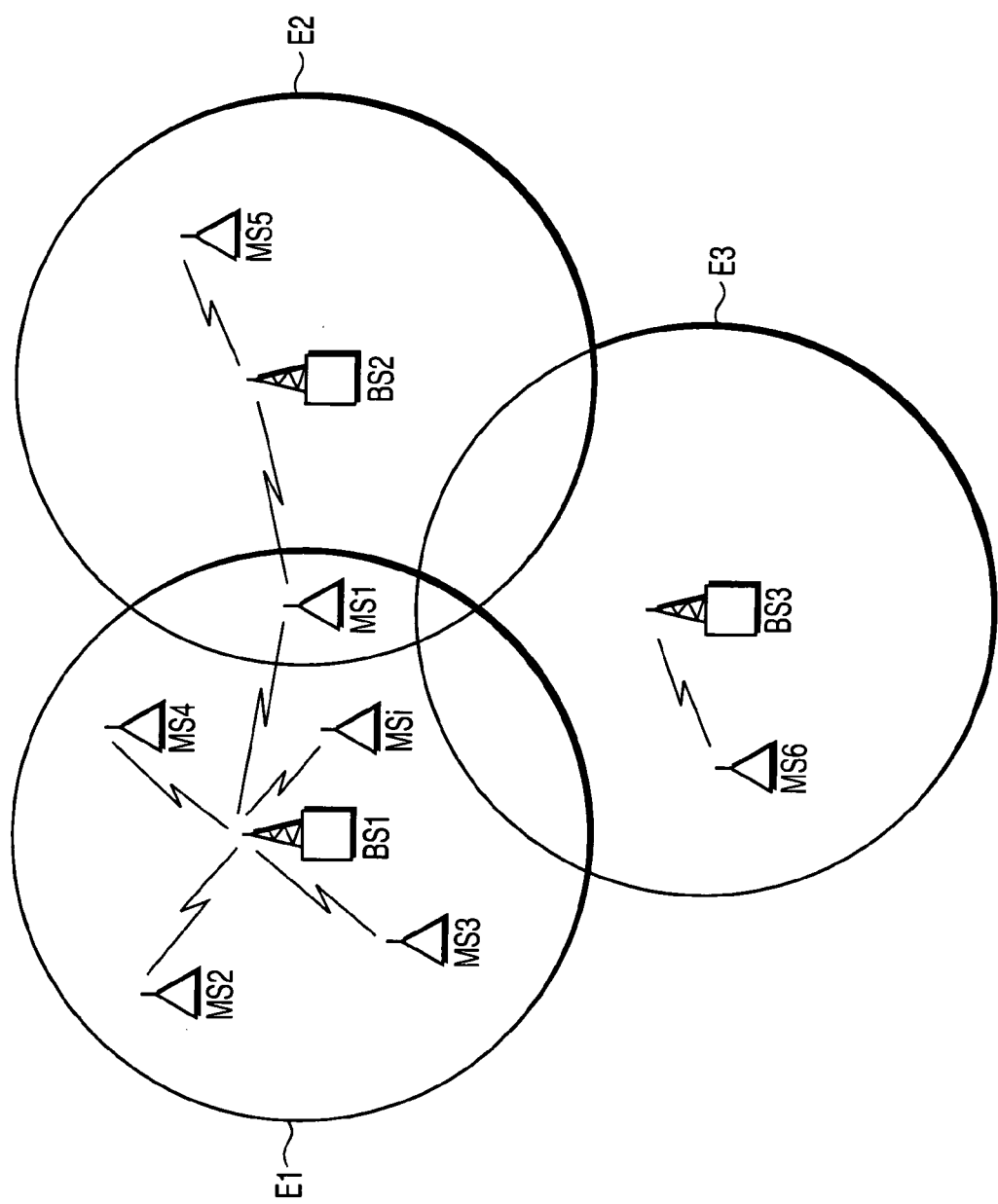
FIG. 1 is a schematic view showing the arrangement of an embodiment of a mobile communication system according to the present invention.

First, an outline of an embodiment of the present invention will be explained below.

In an embodiment of the present invention, a base station calculates an evaluation function value for each of a plurality of mobile communication terminals which have transmitted communication requests. When selecting a mobile communication terminal as a communication destination on the basis of these calculated evaluation function values of the mobile communication terminals, the base station calculates an evaluation function threshold value representing a selection standard on the basis of an evaluation function value of a mobile communication terminal selected in a past predetermined period. The base station transmits the calculated evaluation function threshold value to the plurality of mobile communication terminals. Each mobile communication terminal receives the evaluation function threshold value of each base station transmitted from the base station, and calculates an evaluation function value of each of a plurality of base stations. The mobile communication terminal compares the calculated evaluation function value of each base station with the received evaluation function threshold value. On the basis of the comparison result, the mobile communication terminal selects a base station which is highly likely to select that mobile communication terminal, and transmits a communication request to the selected base station.

Accordingly, each base station calculates an evaluation function threshold value representing a selection standard, and each mobile communication terminal checks its own evaluation function value on the basis of this evaluation function threshold value. The evaluation function threshold value is calculated on the basis of an evaluation function value of a mobile communication terminal selected in a past predetermined period. That is, a threshold value which reflects the traffic of each base station is obtained. Therefore, by checking its own evaluation function value on the basis of this threshold value, each mobile communication terminal can select a base station which is highly likely to select that mobile communication terminal, by taking account of the traffic of the base station.

The embodiment of the present invention has the following practical arrangements.

In the first arrangement, before an evaluation function value is calculated, the communication quality with respect to a base station, e.g., the CIR (Carrier Interference Ratio) of the carrier wave power to the interference wave power of a downstream channel is compared with a preset communication quality threshold value. On the basis of this comparison result, base stations having communication qualities exceeding the threshold value are selected. Evaluation function values of these selected base stations are calculated on the basis of at least the communication quality with respect to each base station.

In this arrangement, base stations which may be selected as a request destination are first selected, and evaluation function values of only these selected base stations are calculated. Therefore, when compared to a case in which evaluation function values of all neighboring base stations are calculated, it is possible to reduce the calculation amount, and thereby reduce the processing load of a controller of each mobile communication terminal.

In the second arrangement, an evaluation function value is calculated on the basis of the communication quality and the data amount transmitted in a past predetermined period. In this manner, a mobile communication terminal can be selected by taking account not only of the communication quality, but also of the data amount transmitted from each base station to each mobile communication terminal. This raises the probability that a mobile communication terminal whose data transmission amount in the past is small is selected, and makes it possible to alleviate the unfairness of the throughput with respect to receiving environments between mobile communication terminals, as in the case of a PF scheduler.

The third arrangement relates to means for calculating an evaluation function threshold value. One means calculates the mean value of evaluation function values of a plurality of mobile communication terminals selected in a past predetermined period, and uses the calculated mean value as an evaluation function threshold value. Another means calculates the median of evaluation function values of a plurality of mobile communication terminals selected in a past predetermined period, and uses the calculated median as an evaluation function threshold value. In these arrangements, evaluation function threshold values based on the past selection results can be relatively easily calculated.

In the fourth arrangement, when selecting a base station, a mobile communication terminal compares evaluation function values of base stations with evaluation function threshold values transmitted from these base stations in order from a base station having the highest communication quality. On the basis of the comparison results, the mobile communication terminal selects a first base station whose evaluation function value exceeds the evaluation function threshold value, as a base station which is highly likely to select that mobile communication terminal. In this arrangement, an appropriate base station can be selected within a short time period without comparing evaluation functions of all base stations.

In the fifth arrangement, when evaluation function values are to be checked in order from a base station having the highest communication quality as described above, an evaluation function value of a base station selected first is compared with an evaluation function threshold value after a first offset value which is large to some extent is added to the evaluation function value. An evaluation function value of a base station selected next is compared with an evaluation function threshold value after a second offset value which is set smaller than the first offset value is added to the evaluation function value. This arrangement raises the possibility that a base station having high communication quality is selected, and makes it possible to keep the throughput high when a slot is allocated by a base station.

An embodiment of a mobile communication system according to the present invention will be described in detail below with reference to the accompanying drawing.

FIG. 1 is a schematic view showing the arrangement of the embodiment of the mobile communication system according to the present invention.

In the system of this embodiment, a plurality of base stations BS1 to BSn (in FIG. 1, only BS1, BS2, and BS2 are illustrated for the sake of convenience) dispersedly arranged in a service area. The base stations BS1 to BSn form radio areas E1 to En called cells. In the radio areas E1 to En, mobile communication terminals MS1 to MSi are connected to the base stations BS1 to BSn via radio channels and can communicate with these base stations. The base stations BS1 to BSn are connected to a control station (not shown) via wired lines, and further connected from this control station to a host network such as a subscriber network or the Internet.

Each of the base stations BS1 to BSn has a function of calculating an evaluation function threshold value and a function of notifying the calculated value, as functions according to the present invention, in addition to a PF scheduler function of the 1xEV-DO system.

The evaluation function threshold value calculating function stores, for a predetermined period T, an evaluation function value DRC/R of a mobile communication terminal selected for each down-stream slot by the PF scheduler function. That is, this function stores evaluation function values DRC/R of mobile communication terminals selected for a predetermined number of slots in the past. The function then calculates the mean or median of these evaluation function values DRC/R stored for the predetermined number of slots in the past. The calculated mean or median of the evaluation function values DRC/R is used as an evaluation function threshold value AB_Eval(BS).

The notification function notifies the control station on the network, which comprehensively controls the base stations BS1 to BSn, of the calculated evaluation function threshold value AB_Eval(BS), and updates a management table prepared in the control station. Consequently, this management table of the control station stores the evaluation function threshold values AB_Eval(BS) of the base stations BS1 to BSn which the control station comprehensively controls. Also, the notification function of each of the base stations BS1 to BSn loads the evaluation function threshold values AB_Eval(BS), including its own value, of neighboring base stations stored in the management table of the control station, and transmits the loaded evaluation function threshold values AB_Eval(BS) and notification information to mobile communication terminals.

Figure 2:
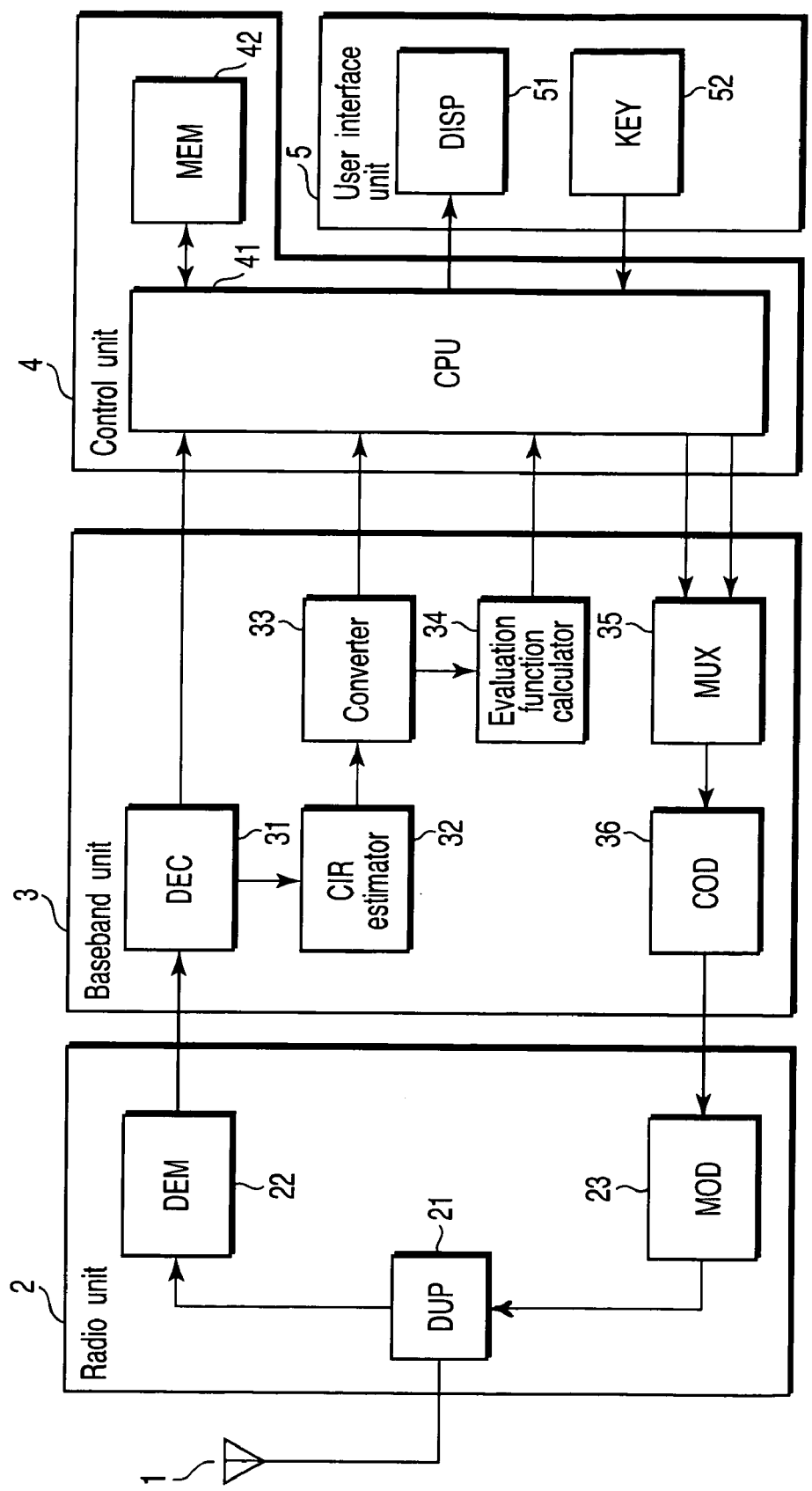
FIG. 2 is a block diagram showing the functional configuration of a mobile communication terminal of the mobile communication system shown in FIG. 1.

Each of the mobile communication terminals MS1 to MSi is configured as follows. FIG. 2 is a block diagram showing the functional configuration of each mobile communication terminal. Each of the mobile communication terminals MS1 to MSi includes an antenna 1, radio unit 2, baseband unit 3, control unit 4, and user interface unit 5.

The radio unit 2 includes a duplexer (DUP) 21, demodulator (DEM) 22, and modulator (MOD) 23. The demodulator 22 has a radio portion and demodulating portion. A radio signal received by the antenna 1 is amplified and filtered by the radio portion, and demodulated by the demodulating portion. The demodulation method is, e.g., quadrature demodulation. The modulator 23 has a modulating portion and radio portion. The modulating portion modulates a radio signal on the basis of an output transmission signal from the baseband unit 3. The modulated radio signal is amplified and transmitted from the antenna to each base station via the duplexer 21. The modulator 23 has, e.g., QPSK (Quadriphase Phase Shift Keying), 8 PSK (8-Phase Shift Keying), and 16 QAM (Quadrature Amplitude Modulation) as the modulation methods, and selectively uses these modulation methods in accordance with the communication quality of a transmission path.

The baseband unit 3 includes, as functions according to the present invention, a decoder (DEC) 31, CIR estimator 32, converter 33, evaluation function calculator 34, multiplexer (MUX) 35, and coder 36. These functions of the baseband unit 3 are implemented by, e.g., a DSP (Digital Signal Processor).

The decoder 31 de-spreads the output demodulated signal from the demodulator 22, and reproduces the received baseband signal. During this decoding process, the decoder 31 also obtains, for each receiving slot, the Ec/Io (the ratio of the pilot signal intensity to the overall received signal intensity) of a downstream channel from a base station to its own terminal. On the basis of this Ec/Io, the decoder 31 calculates the ratio (CIR: Carrier Interference Ratio) of the carrier wave power to the interference wave power in the current receiving slot.

The CIR estimator 32 estimates the CIR of the next receiving slot on the basis of the CIR of the current receiving slot calculated by the decoder 31. If the quality of a downstream channel is relatively stable, the CIR of the current receiving slot may also be directly used in the next receiving slot without performing any CIR estimating process.

Figures 3, 4, 5:
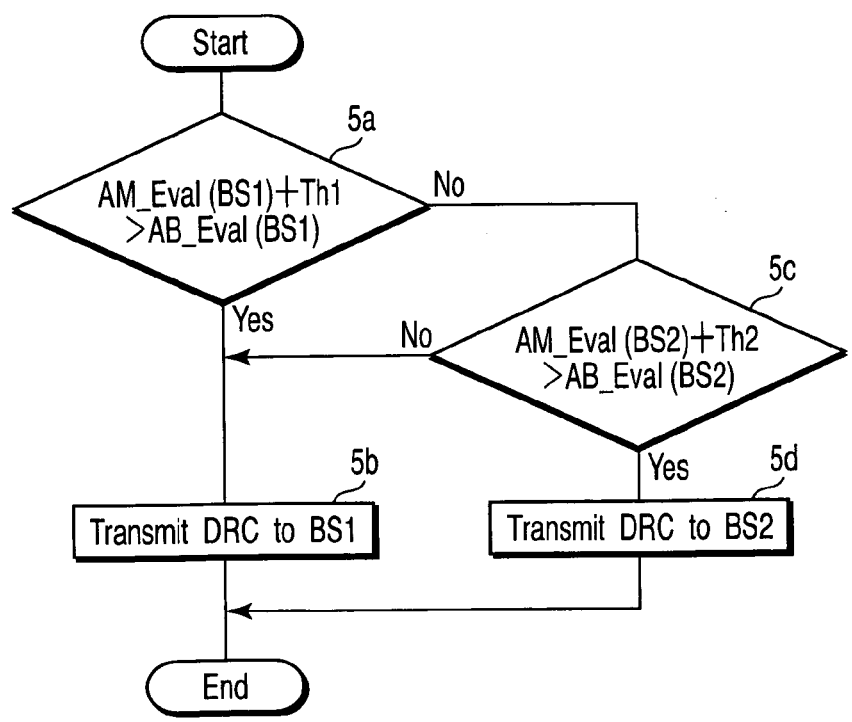
FIG. 3 is a view showing an example of stored information in a DRC storage table formed in the mobile communication terminal shown in FIG. 2.
FIG. 4 is a view showing an example of stored information in an evaluation function value storage table formed in the mobile communication terminal shown in FIG. 2.
FIG. 5 is a flowchart showing the procedure and contents of base station selection control executed in the mobile communication terminal shown in FIG. 2.

The converter 33 converts the estimated CIR into a DRC, and has a CIR-DRC conversion table. The DRC is the maximum communication rate which can be realized under the estimated CIR, i.e., the maximum communication rate by which reception is possible at a predetermined error ratio or less in the current receiving environment in which its own mobile communication terminal is placed. The CIR-DRC conversion table stores DRCs corresponding to CIRs as standards. The converter 33 selectively reads out a DRC corresponding to the estimated CIR from the CIR-DRC conversion table for each receiving slot, and stores the readout DRC in a DRC storage table for each base station. FIG. 3 shows an example of the result of storage.

The evaluation function calculator 34 calculates an evaluation function value of each base station for each receiving slot. In a PF scheduler of the 1xEV-DO system, the evaluation function value is represented by a value DRC/R which is obtained by dividing the maximum communication ratio DRC, which can be realized under the estimated CIR, by a data amount R received in the past from the corresponding base station. The evaluation function calculator 34 stores, in an evaluation function value storage table, the evaluation function value DRC/R of each base station calculated for each receiving slot. FIG. 4 shows an example of the result of storage.

The multiplexer 35 multiplexes output transmission data from the control unit 4 (to be described later) and the DRC of a base station selected by the control unit 4, and supplies this multiplexed data to the coder 36. The coder 36 generates a transmission signal by spreading the multiplexed data supplied from the multiplexer 35 by using a spreading code, and supplies the generated transmission signal to the modulator 23 of the radio unit 2.

The user interface unit 5 has a display (DISP) 51 and input device (KEY) 52. The display 51 is formed by, e.g., an LCD. The input device 52 includes dial keys and function keys.

The control unit 4 includes a CPU (Central Processing Unit) 41 and memory (MEM) 42. The CPU 41 executes access destination base station selection control according to the present invention in accordance with a control program stored in the memory 42.

When an operation of requesting download of data is performed on the input device 52 of the user interface unit 5, and when an incoming call arrives at its own terminal from the network, the access destination base station selection control function first receives notification information from a base station (to be referred to as an active base station hereinafter) which is synchronized with its own terminal. The notification information contains the evaluation function threshold values AB_Eval(BS) of the active base station and base stations (to be referred to as neighboring base stations hereinafter) around the active base station.

Then, the access destination base station selection control function allows the evaluation function calculator 34 to select evaluation function values AM_Eval(BS) of base stations calculated by its own terminal, in descending order of the ratio (CIR: Carrier Interference Ratio) of the carrier wave power to the interference wave power of a downstream channel. The function sequentially compares the selected evaluation function values AM_Eval(BS) with the evaluation function threshold values AB_Eval(BS) of the corresponding base stations acquired by the notification information.

Subsequently, when a base station whose evaluation function value AM_Eval(BS) exceeds the evaluation function threshold value AB_Eval(BS) is found by the comparison, this base station is selected as an access destination base station. The DRC corresponding to the base station is read out from the DRC storage table, and transmitted as a data download request to the selected base station. Note that before the evaluation function values AM_Eval(BS) are compared with the evaluation function threshold values AB_Eval(BS), offset values Th1 and Th2 are added to the evaluation function values AM_Eval(BS).

Figure 6:
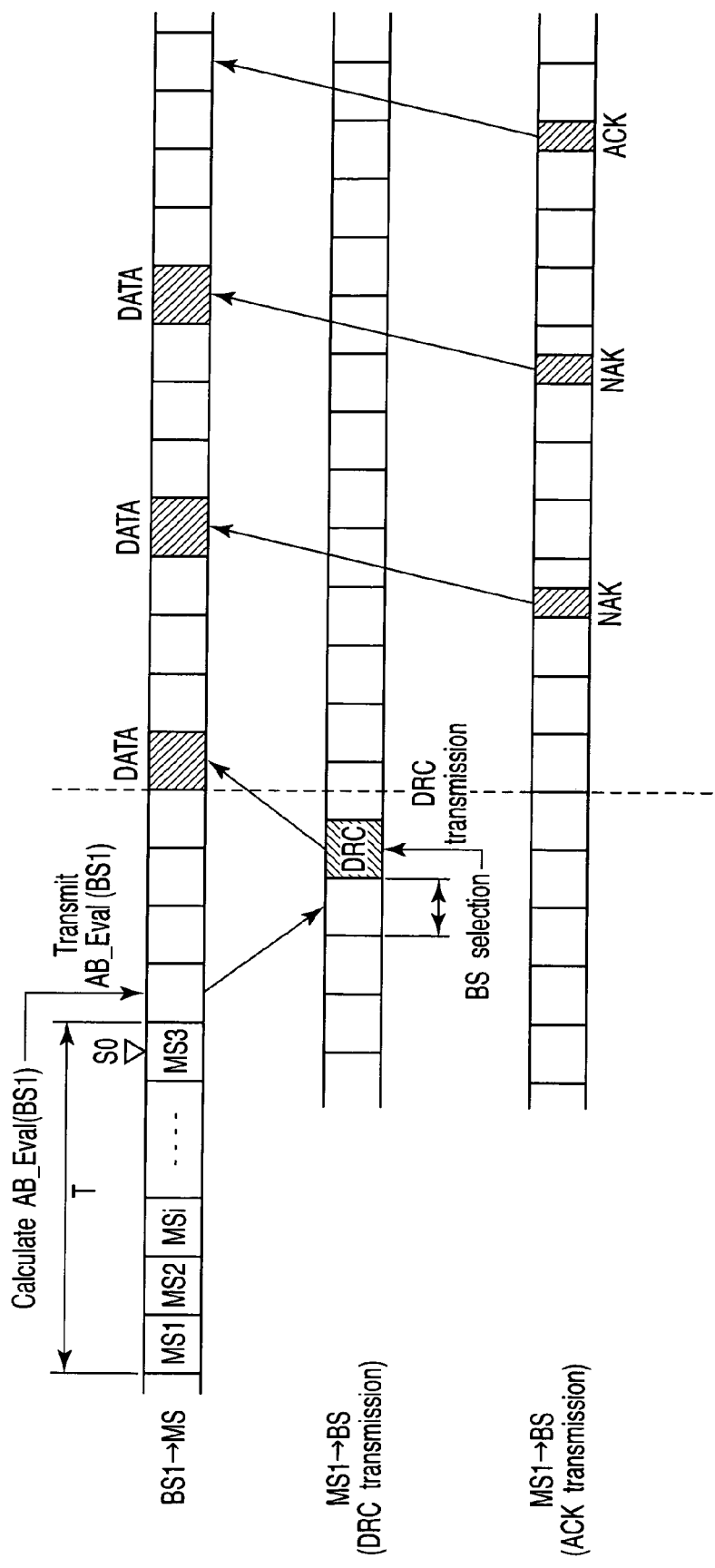
FIG. 6 is a timing chart showing a downstream data transmission control sequence in the mobile communication system shown in FIG. 1.

The operation of the mobile communication system having the above arrangement will be described below with reference to FIGS. 5 and 6. FIG. 5 is a flowchart showing the procedure and contents of base station selection control executed by the mobile communication terminal. FIG. 6 is a timing chart showing the sequence of downstream data transmission control in the mobile communication system. Note that the operation will be explained by taking, as an example, a case in which data is downloaded from the base station BS1 to the mobile communication terminal MS1 in accordance with a request from the mobile communication terminal MS1.

Each of the base stations BS1 to BSn selects a mobile communication terminal as a data transmission destination, and transmits data to the selected mobile communication terminal, in accordance with the PF scheduler function of the 1xEV-DO system. Also, the evaluation function value DRC/R of a mobile communication station selected in each slot by the PF scheduler function is stored over the predetermined period T. As a consequence, in the base station BS1, for example, the evaluation function values DRC/R of the mobile communication terminals MS1, MS2, MSi, . . . , MS3 selected in the past predetermined period T are stored at the timing of a slot S0 shown in FIG. 6.

For each slot, the base station BS1 calculates the mean or median of the evaluation function values DRC/R corresponding to the past predetermined time T and stored as described above, and sets the calculated mean or median of the evaluation function values DRC/R as an evaluation function threshold value AB_Eval(BS1). The base station BS1 notifies the control station on the network of the calculated evaluation function threshold value AB_Eval (BS1).

The control station has a management table. The evaluation function threshold value AB_Eval(BS1) notified from the base station B1 is stored in this management table together with evaluation function threshold values AB_Eval (BS2) to AB_Eval(BSn) similarly notified from the base stations BS2 to BSn.

From the management table of the control station, the base station BS1 loads the evaluation function threshold values AB_Eval(BS1) to AB_Eval(BSn) of the base stations BS1 to BSn at predetermined time intervals. The base station BS1 adds, to notification information, the loaded evaluation function threshold values AB_Eval(BS1) to AB_Eval(BSn) of the base stations BS1 to BSn, a list (neighbor list message) of neighboring base stations, and the like, and transmits this notification information to a mobile communication terminal which is synchronized with the base station BS1.

On the other hand, the mobile communication terminal MS1 receives the notification information from the active base station BS1, when an operation of requesting download of data is performed on the input device 52, or when an incoming call comes from the network. From the received notification information, the mobile communication terminal MS1 extracts the evaluation function threshold values AB_Eval(BS1) to AB_Eval(BSn) of the active base station BS1 and neighboring base stations BS2 to BSn.

At the same time, the mobile communication terminal MS1 receives a pilot signal transmitted from each of the neighboring base stations BS1 and BS2 for each slot, and measures the CIR on the basis of the received power level. The mobile communication terminal MS1 then estimates the CIR in the next slot on the basis of the measured CIR, and reads out a corresponding DRC from the CIR-DRC conversion table on the basis of the value of the estimated CIR. Furthermore, the mobile communication terminal MS1 divides the value of the readout DRC by the data amount R received from the corresponding base station in the past, thereby calculating evaluation function values AM_Eval (BS1) and AM_Eval(BS2) corresponding to the base stations BS1 and BS2, respectively.

Note that if pilot signals are also received from base stations other than the base stations BS1 and BS2, the mobile communication terminal MS1 similarly calculates evaluation function values AM_Eval(BS) of the other base stations. However, prior to the calculations of the evaluation function values AM_Eval(BS), the mobile communication terminal MS1 compares the values of CIRs with a preset CIR threshold value. The mobile communication terminal MS1 calculates evaluation function values AM_Eval(BS) only for base stations having CIRs exceeding this CIR threshold value. In this manner, base stations having low CIRs and unworthy of selection can be excluded before the calculations of the evaluation function values AM_Eval (BS).

Then, the mobile communication terminal MS1 selects a base station optimum as an access destination as follows, on the basis of the evaluation function values AM_Eval(BS1) and AM_Eval(BS2) of the base stations BS1 and BS2, respectively, calculated by itself, and the evaluation function threshold values AB_Eval(BS1) and AB_Eval(BS2) of the base stations BS1 and BS2, respectively, notified by the notification information from the active base station BS1.

That is, from a plurality of base stations which have calculated the evaluation function threshold values, the mobile communication terminal MS1 first selects the base station BS1 having the highest reception quality on the basis of the CIR. In step 5a shown in FIG. 5, the mobile communication terminal MS1 compares the evaluation function value AM_Eval(BS1) of the selected base station BS1 with the evaluation function threshold value AB_Eval(BS1) of the base station BS1 notified by the notification information. Before this comparison, the offset value Th1 is added to the evaluation function value AM_Eval(BS1). If the comparison result indicates that the evaluation function value AM_Eval (BS1) calculated by the mobile communication terminal MS1+the offset value Th1 is larger than the notified evaluation function threshold value AB_Eval(BS1) of the base station BS1, the mobile communication terminal MS1 determines that this terminal is highly likely to be selected by the base station BS1. Therefore, the flow advances to step 5b, and the mobile communication terminal MS1 transmits the DRC to the base station BS1.

On the other hand, if the comparison result indicates that the evaluation function value AM_Eval(BS1)+the offset value Th1 is equal to or smaller than the notified evaluation function threshold value AB_Eval(BS1), the mobile communication terminal MS1 selects the base station BS2 having the second highest reception quality (CIR). The flow then advances to step 5c, and the mobile communication terminal MS1 compares the evaluation function value AM_Eval(BS2) of the selected base station BS2 with the evaluation function threshold value AB_Eval(BS2) of the base station BS2 notified by the notification information. Before this comparison, the offset value Th2 is added to the evaluation function value AM_Eval(BS2). Note that the offset value Th2 and the offset value Th1 described above have the relation of Th1>Th2. This raises the probability that the base station BS1 having higher reception quality is preferentially selected.

If the comparison result indicates that the evaluation function value AM_Eval(BS2) calculated by the mobile communication terminal MS1+the offset value Th2 is larger than the notified evaluation function threshold value AB_Eval(BS2) of the base station BS2, the mobile communication terminal MS1 determines that this terminal is highly likely to be selected by the base station BS2. Therefore, the flow advances to step 5d, and the mobile communication terminal MS1 transmits the DRC to the base station BS2. On the other hand, if the comparison result indicates that the evaluation function value AM_Eval(BS2)+the offset value Th2 is equal to or smaller than the notified evaluation function threshold value AB_Eval(BS2), the flow advances to step 5b, and the mobile communication terminal MS1 transmits the DRC to the active base station BS1.

When receiving the DRC, the base station BS1 calculates the DRC/R by the PF scheduler function, selects a mobile communication terminal having the highest DRC/R, and transmits data to the selected mobile communication terminal. As shown in FIG. 6, the data transmission timing lags behind the reception of the DRC from the mobile communication terminal by a half slot. This is so because the DRC is transmitted from the mobile communication terminal in the middle of two adjacent transmission slots of the base station as shown in FIG. 6, by taking account of change of the estimated CIR with time.

Also, as shown in FIG. 6, data transmission to the mobile communication terminal which has transmitted the DRC is performed at an interval of three slots, i.e., in a period of four slots. When data is transmitted from the base station, the mobile communication terminal checks whether an end command is contained in the received data. If no end command is contained, the mobile communication terminal returns "NAK" as shown in FIG. 6, thereby subsequently receiving data transmitted from the base station after four slots. If an end command is contained, the mobile communication terminal returns "ACK" and terminates data reception.

In this embodiment as described above, in each of the base stations BS1 to BSn, the evaluation function values DRC/R of mobile communication terminals selected in individual slots by the PF scheduler function are stored over the predetermined period T. The mean or median of the evaluation function values DRC/R stored over the predetermined time T is calculated, and the calculated mean or median of the evaluation function values DRC/R is transmitted as an evaluation function threshold value to the mobile communication terminals MS1 to MSi. Each of the mobile communication terminals MS1 to MSi acquires the evaluation function threshold values of the base stations BS1 to BSn from the notification information notified from the active base station, and calculates the evaluation function value of each base station in each slot. The mobile communication terminal compares the calculated evaluation function value with the evaluation function threshold value of the corresponding base station. On the basis of the comparison results, each of the mobile communication terminals MS1 to MSi selects, as an access destination base station, a base station whose evaluation function value calculated by the mobile communication terminal exceeds the evaluation function threshold value, and transmits the DRC to this base station.

Accordingly, each of the mobile communication terminals MS1 to MSi checks the evaluation function value calculated by itself by using, as a threshold value, the mean or median of the evaluation function values of the mobile communication terminals selected in the past predetermined period, i.e., the evaluation value reflecting the traffic of each base station. Therefore, each of the mobile communication terminals MS1 to MSi can select a base station which is highly likely to select that mobile communication terminal, and transmit the DRC to the selected base station. As a consequence, scheduling can be performed by taking account not only of the reception quality of a downstream channel and the past data transmission amount, but also of the traffic amounts in the base stations BS1 to BSn. In this manner, the throughput of the entire system can be further increased.

Note that the present invention is not limited to the above embodiment. For example, in base station selection control of the above embodiment, the different offset values Th1 and Th2 are added to the evaluation function values AM_Eval(BS1) and AM_Eval(BS2). However, equal offset values may also be added to the evaluation function values AM_Eval(BS1) and AM_Eval(BS2). Also, it is not always necessary to add any offset values. Alternatively, it is also possible to adjust the evaluation function threshold values AB_Eval(BS1) and AB_Eval(BS2), instead of adding offset values to the evaluation function values.

Furthermore, if a mobile communication terminal is not selected by a certain base station although this mobile communication terminal has selected the base station and transmitted a communication request, an offset value to be added to an evaluation function value calculated by the mobile communication terminal itself is preferably changed to a small value. This makes it possible, in base station selection control in the next slot, to lower the probability that the above base station is selected again, and raise the probability that another base station is selected.

In addition, the type and arrangement of system, the evaluation function threshold value calculation method in the base station, the length of the predetermined period T, and the procedure and contents of base station selection control in the mobile communication terminal can be variously modified when practiced without departing from the spirit and scope of the present invention.

In conclusion, the present invention is not directly limited to the above embodiment, but can be implemented, when practiced, by modifying the constituent elements without departing from the spirit and scope of the invention. Also, various inventions can be formed by appropriately combining a plurality of constituent elements disclosed in the embodiment. For example, some of all the constituent elements disclosed in the embodiment may also be deleted. Furthermore, constituent elements over different embodiments may also be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication system comprising:
a plurality of base stations; and
a plurality of mobile communication terminals each of which transmits a communication request to one of the plurality of base stations and communicates with the base station,
each of the plurality of base stations comprising:
means for calculating an evaluation function value of each of a plurality of mobile communication terminals which have transmitted the communication requests, on the basis of at least communication quality between the base station and mobile communication terminal;
means for selecting a mobile communication terminal as a communication destination on the basis of the calculated evaluation function value of each mobile communication terminal, and communicating with the selected mobile communication terminal;
means for calculating an evaluation function threshold value representing a selection standard, on the basis of an evaluation function value of a mobile communication terminal selected in a past predetermined period; and
means for transmitting the calculated evaluation function threshold value to the plurality of mobile communication terminals, and
each of the plurality of mobile communication terminals comprising:
means for receiving an evaluation function threshold value of each base station transmitted from the base station;
means for calculating an evaluation function value of each of the plurality of base stations on the basis of communication quality between the mobile communication terminal and base station;
means for comparing the calculated evaluation function value of each base station with the received evaluation function threshold value, and, on the basis of the comparison result, selecting a base station which is highly likely to select the own mobile communication terminal; and
means for transmitting the communication request to the selected base station.

2. The system according to claim 1, wherein the means for calculating an evaluation function value comprises:
means for comparing communication quality between the mobile communication terminal and each base station with a predetermined communication quality threshold value, and selecting a base station whose communication quality exceeds the communication quality threshold value; and means for calculating an evaluation function value of the selected base station on the basis of at least communication quality between the mobile communication terminal and base station.

3. The system according to claim 1, wherein the means for calculating an evaluation function value calculates an evaluation function value on the basis of communication quality and a data amount transmitted in a past predetermined period.

4. The system according to claim 1, wherein the means for calculating an evaluation function threshold value calculates a mean value of evaluation function values of a plurality of mobile communication terminals selected in a past predetermined period, and uses the calculated mean value as an evaluation function threshold value.

5. The system according to claim 1, wherein the means for calculating an evaluation function threshold value calculates a median of evaluation function values of a plurality of mobile communication terminals selected in a past predetermined period, and uses the calculated median as an evaluation function threshold value.

6. The system according to claim 1, wherein the means for selecting a base station compares an evaluation function value with the received evaluation function threshold value in order from a base station having highest communication quality, and selects a first base station whose evaluation function value exceeds the evaluation function threshold value, as a base station which is highly likely to select the own mobile communication terminal.

7. The system according to claim 6, wherein the means for selecting a base station comprises:

means for adding a first offset value to an evaluation function value of a base station having first communication quality;

means for comparing the evaluation function value to which the first offset value is added, with the received evaluation function threshold value;

means for, if the comparison result indicates that the evaluation function value to which the first offset value is added does not exceed the evaluation function threshold value, adding a second offset value smaller than the first offset value to an evaluation function value of a base station having second communication quality lower than the first communication quality; and means for comparing the evaluation function value to which the second offset value is added, with the received evaluation function threshold value.

8. A mobile communication terminal used in a mobile communication system comprising a plurality of base stations, and a plurality of mobile communication terminals each of which transmits a communication request to one of the plurality of base stations and communicates with the base station, each of the plurality of base stations comprising means for calculating an evaluation function value of each of a plurality of mobile communication terminals which have transmitted the communication requests, on the basis of at least communication quality between the base station and mobile communication terminal, means for selecting a mobile communication terminal as a communication destination on the basis of the calculated evaluation function value of each mobile communication terminal, and communicating with the selected mobile communication terminal, means for calculating an evaluation function threshold value representing a selection standard, on the basis of an evaluation function value of a mobile communication terminal selected in a past predetermined period, and means for transmitting the calculated evaluation function threshold value to the plurality of mobile communication terminals, comprising:

means for receiving an evaluation function threshold value of each base station transmitted from the base station;

means for calculating an evaluation function value of each of the plurality of base stations on the basis of communication quality between the mobile communication terminal and base station;

means for comparing the calculated evaluation function value of each base station with the received evaluation function value, and, on the basis of the comparison result, selecting a base station which is highly likely to select the own mobile communication terminal; and means for transmitting the communication request to the selected base station.

9. The terminal according to claim 8, wherein the means for calculating an evaluation function value comprises:

means for comparing communication quality between the mobile communication terminal and each base station with a predetermined communication quality threshold value, and selecting a base station whose communication quality exceeds the communication quality threshold value; and means for calculating an evaluation function value of the selected base station on the basis of at least communication quality between the mobile communication terminal and base station.

10. The terminal according to claim 8, wherein the means for calculating an evaluation function value calculates an evaluation function value on the basis of communication quality between the mobile communication terminal and base station and a data amount transmitted in a past predetermined period.

11. The terminal according to claim 8, wherein the means for selecting a base station compares an evaluation function value with the received evaluation function threshold value in order from a base station having highest communication quality, and selects a first base station whose evaluation function value exceeds the evaluation function threshold value, as a base station which is highly likely to select the own mobile communication terminal.

12. The terminal according to claim 11, wherein the means for selecting a base station comprises:

means for adding a first offset value to an evaluation function value of a base station having first communication quality;

means for comparing the evaluation function value to which the first offset value is added, with the received evaluation function threshold value;

means for, if the comparison result indicates that the evaluation function value to which the first offset value is added does not exceed the evaluation function threshold value, adding a second offset value smaller than the first offset value to an evaluation function value of a base station having second communication quality lower than the first communication quality; and means for comparing the evaluation function value to which the second offset value is added, with the received evaluation function threshold value.

* * * * *